United States Patent [19]
Spencer

[11] Patent Number: 5,577,241
[45] Date of Patent: Nov. 19, 1996

[54] INFORMATION RETRIEVAL SYSTEM AND METHOD WITH IMPLEMENTATION EXTENSIBLE QUERY ARCHITECTURE

[75] Inventor: Graham Spencer, Cupertino, Calif.

[73] Assignee: Excite, Inc., Mountain View, Calif.

[21] Appl. No.: 350,967

[22] Filed: Dec. 7, 1994

[51] Int. Cl.[6] ................................... G06F 17/30
[52] U.S. Cl. .................... 395/605; 364/DIG. 1; 364/282.1; 364/283.2
[58] Field of Search ................... 395/600, 575, 395/700, 650

[56] References Cited

U.S. PATENT DOCUMENTS

| | | | |
|---|---|---|---|
| 4,931,928 | 6/1990 | Greenfeld | 395/600 |
| 5,161,214 | 11/1992 | Addink et al. | 395/145 |
| 5,265,065 | 11/1993 | Turtle | 395/600 |
| 5,311,595 | 5/1994 | Bjerrum et al. | 380/25 |
| 5,321,833 | 6/1994 | Chang et al. | 395/600 |
| 5,377,103 | 12/1994 | Lamberti et al. | 364/419.08 |
| 5,404,506 | 4/1995 | Fujisawa et al. | 395/600 |
| 5,412,804 | 5/1995 | Krishna | 395/600 |
| 5,421,008 | 5/1995 | Banning et al. | 395/600 |
| 5,446,885 | 8/1995 | Moore et al. | 395/600 |
| 5,448,727 | 9/1995 | Annevelink | 395/600 |

OTHER PUBLICATIONS

Paepcke, Andreas, "An Object-Oriented View Onto Public, Heterogeneous Text Databases", Ninth International Conference on Data Engineering, Apr., 1993, IEEE Computer Society, pp. 484–493.

Vrbsky, S. V. and Liu, J. W. S., "An Object-Oriented Query Processor that Produces Monotonically Improving Approximate Answers", Seventh International Conference on Data Engineering, Apr., 1991, IEEE Computer Society, pp. 472–481.

*Primary Examiner*—Thomas G. Black
*Assistant Examiner*—C. Pham
*Attorney, Agent, or Firm*—Fenwick & West LLP

[57] ABSTRACT

An information retrieval system incorporates an extensible query architecture allowing an applications programmer to integrate new query models into the system as desired. The query architecture is based on an abstract base class of query nodes, or code objects that retrieve records from the database. Specific subclasses for particular query models are derived from the base class. Each query node class includes a search function that iteratively searches the database for matching records. Query node objects are instantiated by associated node creator class objects. A parser is used to parse a search query into its components, including nested search queries used to combine various query models. The parser determines the particular search operator keywords, and the node creator object for instantiating the appropriate query node object for each search operator. The node creator objects return pointers to the created query nodes, allowing the parser to assemble complex hierarchical query nodes that combine multiple query models.

14 Claims, 5 Drawing Sheets

INFORMATION RETRIEVAL SYSTEM AND METHOD WITH IMPLEMENTATION EXTENSIBLE QUERY ARCHITECTURE

BACKGROUND

1. Field of the Invention

This invention relates generally to the field of information retrieval systems and methods, and more particularly, to methods for combining multiple queries through an abstract programming interface.

2. Background of the Invention

Information retrieval systems typically include a database of records, a processor for executing searches on the records, and specifically adapted application software, such as a database management system, for accepting search queries, managing the processor, and handling the search results. In general, the database can include information such as text documents, financial records, medical files, personnel records, technical documentation, graphical data, or various combinations of such items. In order to effectively search and retrieve desired items, the search application typically supports a limited number of query models, or search operations, specifically designed to operate on the underlying data types in the database. For example, a typical document database, such as a database of news publications, may be organized with each news article as a record, with fields for publication date, author, title, industry category, and body text. A simple search application may then support full text searching for all text fields, individual field searching, such as searching by the date or author fields, and various boolean search operations, such as conjunction, disjunction, and negation. A more sophisticated search application may also support proximity based searching, allowing a user to locate word tuples having specified proximities. This would allow a user, for example, to locate in such a news database, all articles having the words "Clinton" within 25 words of "foreign policy." Thus, proximity searching is specific form of boolean conjunction.

One of the limitation of existing information retrieval systems is the difficulty in combining different query models in a single search. For example, a simple system may allow a user to perform either full text searching, or field based search, but not both in a single query. A user interested in retrieving documents having certain keywords would be unable to simultaneously constrain the documents to those of given date, author, or the like. More robust systems may offer only a limited mixing of field based searching and full text searching, but do not support full integration of non-field based queries. This limitation stems primarily from the query architecture used by the software vendor, with the various different query models having incompatible operations or algorithms.

The difficulty in combining multiple query models generally results from the non-extensible query architecture that underlies the information retrieval system. In conventional information retrieval systems, the various query models that are supported, such as text based searching, boolean searching, and the like, are normally implemented with implementation specific code, designed for the specific data types and operations available in the information retrieval system. The software vendor does not provide any capability for an extensible architecture for the search operations or data types available in the system. This is generally because of the implementation specific storage and performance constraints that the vendor has designed into the information retrieval system. Thus, an applications programmer utilizing the information retrieval system will typically be constrained to using search operations that the vendor has provided, and will be unable to add new search operations for new query models or data types. Continuing the prior example of the database of news publications where the software vendor has provided only full text, field, and boolean query operations, an applications programmer would typically be unable to add search operations that retrieved documents based on statistical information, such as the number of references to a given word or set of words, or the frequency of specific references in arbitrary subsets of the database.

Another limitation of existing information retrieval systems is that the search algorithms are designed to execute over a substantial portion of the database, returning their results in memory intensive arrays or similar structures. Typically, the software vendor defines the computational design of each search operation, preventing the applications developer from designing more efficient algorithms for implementing a giver search operation. This results in limitations on the performance an information retrieval system can deliver.

Accordingly, it is desirable to provide a query architecture for an information retrieval system that is extensible and allows for the efficient integration of new query models designed for an open variety of data types and formats. This would allow the information retrieval system to support any arbitrary combination of query models, and further allow the applications programmer to add new query models and data types to the system as needed or desirable. A desirable query architecture should place minimal constraints on the necessary storage and performance needed to perform search operations. This would allow the applications programmer to design the information retrieval system to perform efficiently on a variety of operating platforms.

SUMMARY OF THE INVENTION

The present invention overcomes the limitations of the prior art by providing an extensible query architecture that allows the creation and integration of new query models into an information retrieval system, and further provides for the efficient combination of multiple query models during individual search operations. The invention comprises a information retrieval system including a search application that has a variety of code module classes, each one for implementing a specific type of query model on particular data types in an attached database. The code module classes, or QueryNodes, all derive from a common QueryNode class which defines the architecture of all the query nodes. The QueryNodes all share a common object interface that allows the system to combine QueryNodes representing different query models into a single search query.

Each query node object is capable of performing a search query and describing its results by associating a document score with each document in the database subject to the query. Specifically, each query node object, regardless of the query model that it implements, uses a common signature or interface for accepting input arguments. The interface is designed to allow other query node objects to be part of the argument list. This allows different query models to be combined in a single search query.

In order to allow the query nodes to have a common interface, the query nodes include a search function that operates consistently for different query nodes. The search function is designed to take as its input a document number representing a document in the database. The query node search function locates a document in the database with a document number greater than or equal to the input document number (thereby ensuring that each document is evaluated only once for a given query model) that has a non-zero document score. The document score is determined by an independent scoring function that can be designed separately from the search function, and which is called by the search function as needed. Separating the scoring function from the search function increases the flexibility and generality of the search function. If a document with a non-zero score is found, the query node updates a document score parameter that is also passed to the query node. Since the search function operatively iteratively, the entire database need not be searched at once, but rather, the execution of the search can be scheduled as necessary, with portions of the database searched in one batch, and other portions searched separately, or not at all.

The invention supports the combination of multiple query models by allowing a query node to invoke other query nodes during execution, and to act on the results provided by the invoked query node. The information retrieval system of the invention uses a parser that identifies in an input search query the various operators and arguments that comprise the search query, including multiple nested search operators. For each search operator that the parser identifies, there is a stored association with a code module that creates a query node for executing the search operation represented by the search operator. Thus, for example, for a field based search, such as searching by the date of a record, a search query may take the form "DATE(>07/11/1987)." The parser identifies the search operator "DATE" and then calls a code module called a NodeCreator, that instantiates a code object from the particular query node class for searching date type fields in the database, the query node object being dynamically created for performing the requested search operation. The NodeCreator returns to the parser a pointer to the newly created query node object. Combinations of different types of query models are possible because even though the underlying query models may be different, all query node objects interface with each other and the parser in a standard manner. In particular, any query node object can be one of the arguments to another query node object, thereby allowing any combination of child query types to be created by the user. The parser manages the combination of child query node objects to create a single parent query node for execution by the system.

The query architecture is extensible because new query models can be implemented by creating new query object subclasses from the QueryNode base class, and providing them with a complementary scoring function. For each new query node class, a new search operator is also created and stored in association with a NodeCreator class object for instantiating an object from the new class whenever the search operator is used.

DETAILED DESCRIPTION OF THE PREFERRED EMBODIMENT

Figure 1:
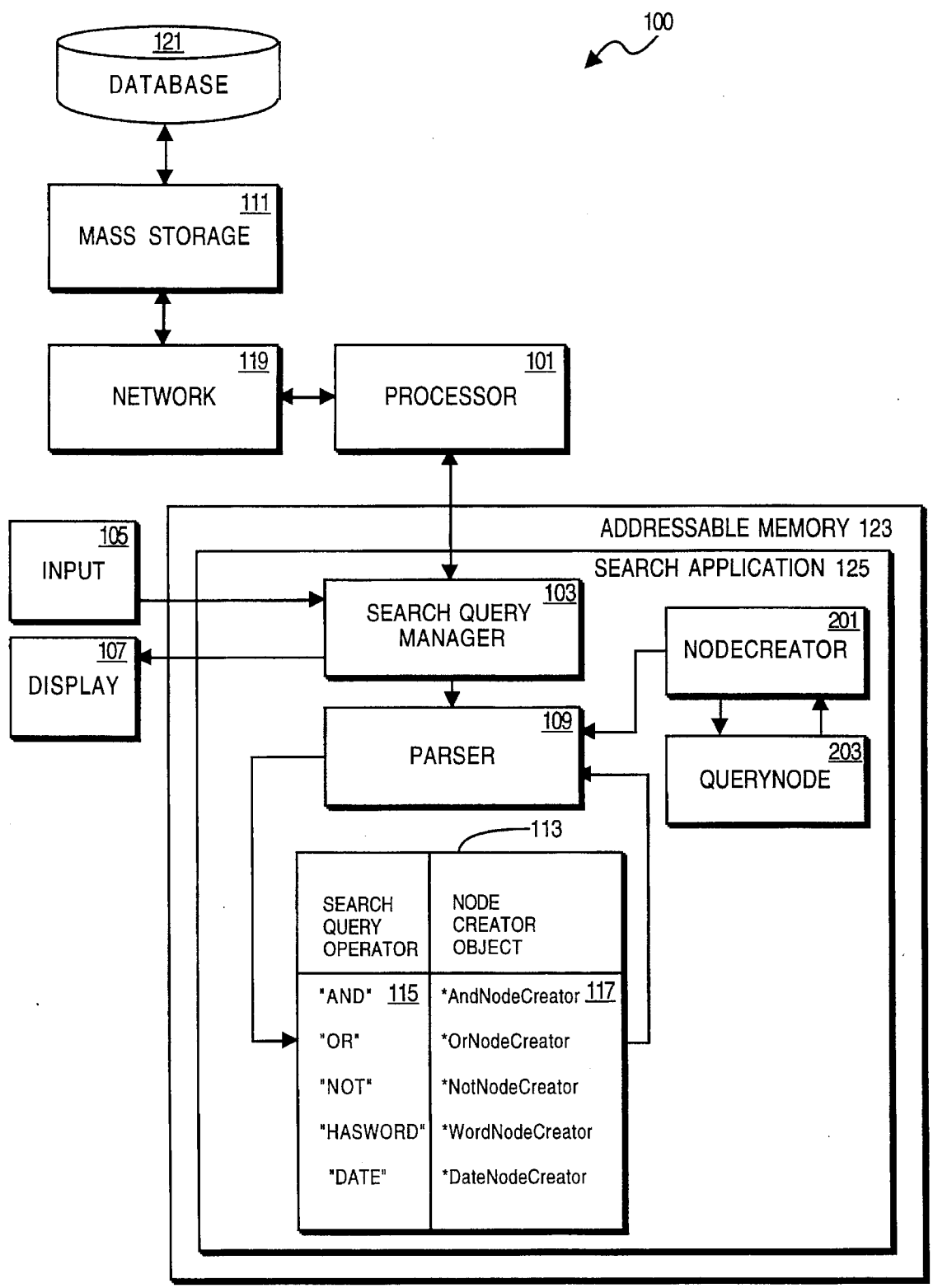
FIG. 1 is a block diagram of one embodiment of the information retrieval system of the present invention.

Referring now to FIG. 1, there is shown one embodiment of the present invention for combining multiple queries using an extensible query architecture.

The information retrieval system 100 includes a processor 101 operatively coupled to a display 107, an input device 105, a network connection 119, and an addressable memory 123. In the preferred embodiment the system 100 can be implemented on a Sun Microsystems Sparc workstation, or any other comparable computer, using software in the addressable memory 123 embodying the query architecture of the present invention. The network connection 119 provides access to a remotely situated mass storage device 111 which stores any type of database 121, such as text documents, financial records, medical records, technical manuals, and the like. The display 107 is of conventional design and provides output for a graphical user interface to a search application 125 stored in the addressable memory 123. An input device 105, such as a keyboard, mouse, and the like, is provided for inputting commands and search queries to the search application 125. The input device 105 may include a voice recognition unit to directly accept spoken search queries or commands.

The addressable memory 123 contains a search application 125 incorporating the query architecture of the present invention. The search application 125 is preferably implemented in an object oriented programming language, such as C++ (which will be used for examples herein), but may be implemented in other programming languages. The search application 125 includes a search query manager 103, a parser 109, a search operator association table 113, a number of NodeCreator objects 201, and a number of QueryNode objects 203.

In order to provide an interface to the user for using the information retrieval system 100, the search query manager 103 is coupled to the input device 105 and the display 107, and accepts a search query input by a user with the input device 105. The input search query is eventually processed by the processor 101 to apply it to the databases 121 stored in the mass storage devices 111, either locally, or on the network 119. Any results for the search query are returned to the search query manager 103 for outputting on the display 107.

The search query manager 103 accepts search queries having specific keywords that act as search operators, each search operator associated in the addressable memory 123 with a particular query node class that implements a given query model, as further described below. The search operators may include keywords for creating boolean queries, such as "AND," "OR," "NOT," keywords such as "DATE" and "TIME" for retrieving documents having particular creation or modification dates or times, and keywords such as "HASWORD" (or conventionally the absence of any keyword) for retrieving documents having particular words. Because the query models are extensible, new search operator keywords can be created by the applications programmer to access new query models.

Each search query is composed of at least one search operator and zero or more data elements which are the arguments for the search operator. A simple search query is:

(HASWORD computer)

This search query is a full text search query and would be used to retrieve all documents in the database that have the word "computer" in their text.

It is noted that the sample search queries are illustrated here by explicitly including the search operator merely to increase the clarity of the disclosure. In actual practice search operators can be implicitly represented so that the user need only enter the data elements for the search query, with the parser 109 determining the search operators associated with each data element based on predefined parsing rules, field values, and the like. Thus, in one embodiment, the above search query may be enter by the user as merely "computer." Also, the examples here as shown use prefix notation merely to more accurately capture the hierarchical nature of complex search queries; other syntax notations, including infix and postfix may also be used.

Where the database includes specific fields, such as a date field, another simple search query could be:

(DATE>03/03/94)

This search query operates on a date type field, and returns documents with a date after Mar. 3, 1994. The data elements for a search operator may include other search queries, thereby allowing simple search queries to be nested to form complex search queries, such as:

(AND (HASWORD computer)(NOT (HASWORD Intel))(DATE>03/03/94))

This sample search query is a multiway boolean and query, each conjunct itself a search query including a search operator and a data element. This search query is for retrieving documents that have the word "computer" but do not have the word "Intel" in their text, and which have a creation date after Mar. 3, 1994. In this complex search query, the AND is the "parent" query, and the conjuncts are "child" queries. The ability to form complex search queries is useful for efficiently combining query models.

The search query manager 103 passes an input search query to the parser 109. The parser 109 is a text parser that decomposes an input search query into its constituent parts, identifying any nested search queries, the search operator in each search query, whether explicitly or implicitly represented, and the data element associated with each search operator, if any. Thus, with the previous complex search query, the parser 109 would identify the following child queries:

(DATE>03/03/94)

(HASWORD Intel)

(NOT (HASWORD Intel))

(HASWORD computer) and the parent query (AND (HASWORD computer)(NOT(HASWORD Intel))(DATE>03/03/94)

In the preferred embodiment the parser 109 decomposes the search query recursively, though non-recursive parsing may also be performed, to identify the inner most child components, specifically those search queries whose data elements are string values, including numerical values, and not further child queries.

The parser 109 has access to a search operator association table 113 that associates the search operator keywords 115 with pointers 117 to NodeCreator 201 objects. The table 113 may be implemented as a hash table or other suitable data structure. The NodeCreator 201 objects derive from a NodeCreator 201 base class, each NodeCreator 201 object implementing a method that creates a particular QueryNode 203 object for executing a query of the type specified by the search operator.

Figure 2:
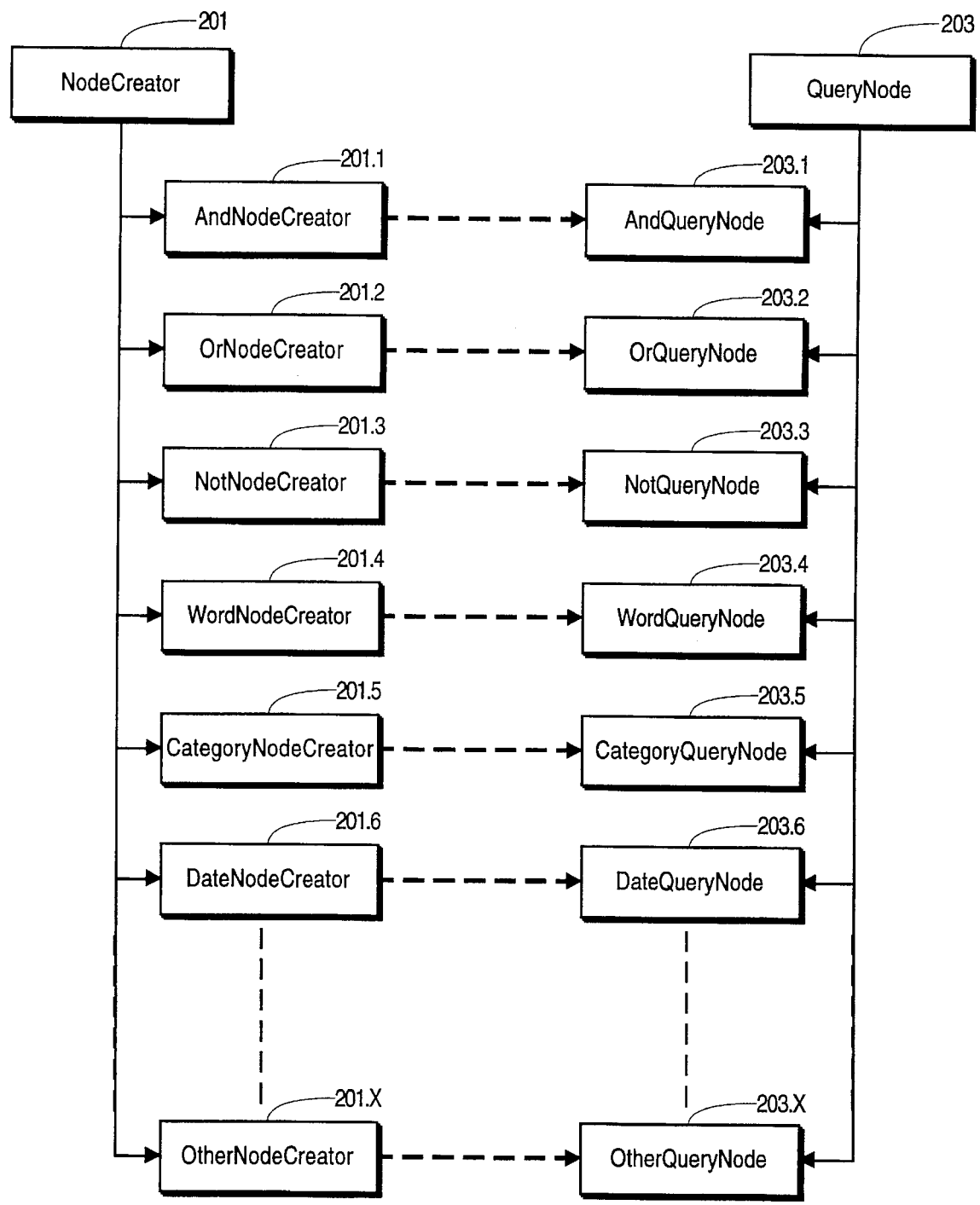
FIG. 2 is an object hierarchy diagram showing the object class hierarchies for the NodeCreator and QueryNode classes.

FIG. 2 is an object class diagram for the NodeCreator 201 and QueryNode 203 classes. The QueryNode 203 class is an abstract class from which specific QueryNode subclasses can be derived, each QueryNode subclass being used to instantiate a code object that performs a specific search query and returns a value describing its results.

One of the benefits of the extensible query architecture of the present invention is that is supports any variety of query models, including full text searching, field based searching, knowledge based searching, statistical searching, and the like. Because the QueryNode 203 class is an abstract class, it provides the basis of the extensible query architecture by allowing the applications programmer to implement new query models specifically designed to meet the search needs of the user, or the database environment by deriving new NodeCreator 201.x and QueryNode 203.x classes from the respective base classes.

The QueryNode 203 class has the various members for effecting a search query. Specifically, the QueryNode 203 class has a data element member that is used to store the argument on which the QueryNode 203 object is to perform its member functions.

The QueryNode 203 class further has a member function performs the search operation on the database. The search function associates a particular score with each document or record in the database. The score of each document is then evaluated using defined weighting and evaluation functions in order to segregate and rank the documents as to the relevance to the input search query. In the preferred embodiment, this search function of the QueryNode 203 class performs an iterative search by locating a single document with a non-zero score. This function can be illustrated as follows by the following C++ function prototype:

```
class QueryNode {
    public:
        virtual int next(int* doc_num, float* doc_score) {
            code to implement actual query model
        }
};
```

The next function takes as its primary input a document number doc_hum. The document number is a unique serialized integer value for each document in the database. The doc_score is an input/output parameter, and is an evaluated value for a document with respect to the search query being executed by the particular QueryNode 201 object. In the preferred embodiment the document score is not determined directly by the next function, but is computed by a specific scoring function that is called by the next function. When passed a document number, the next function locates in the database another document whose document number is greater than or equal to the input document number, and whose document score is greater than zero. If such a document exists, then doc_score is set to the document score of the located document, and next returns 1 indicating a successful search. If no such document exists, next returns 0. This allows the next function to evaluated only once for each non-zero document in the database. This results in increased performance for the search operation because the number of non-zero documents resulting from a given search query is typically significantly less than the total number of documents in the database, thereby reducing the search space operated over by the next function.

The iterative operation of the next function provides increased flexibility and efficiency over existing search query interfaces. Conventional search routines search many, if not all, documents in a database, either directly, or indirectly through indexed tables or the like, and return an array of document scores. This conventional approach is both memory intensive and algorithmically inefficient: it is memory intensive because it returns an array of scores, many of which will be 0 since the documents are not "hits." Second, returning an array of (doc_num, doc_score) tuples is algorithmically inefficient because it requires that the search query be evaluated completely over the entire database, thereby consuming a significant amount of processing time. Such as array implementation discourages the applications programmer from implementing other data structures that are better adapted to store search results, due to the overhead involved in converting the array to a desired form. Other conventional scoring interfaces that provide a score for each document in the database, such as virtual float score (int doc_num) are also inefficient because the function must be executed once for every document in the database, even though most documents will have a score of 0. Because the next function does not attempt to return all matching documents at one time, the applications programmer can implement the search application 125 to effect the next function in the most efficient manner, for example, by delaying performing parts of a search query until the system load decreases, or some higher priority process is completed. The iterative nature of the next function obviously applies to all child QueryNodes in a search query, thus the applications programmer can control the execution of a complex search query, rather than relying entirely on the internal search engine to manage the execution process. Since the applications programmer can assume that most search queries will be executed sequentially, the search application 125 can be optimized for this search pattern while still allowing flexibility for alternative search implementations. In this manner, the query node architecture in implementation independent.

Referring again to FIG. 2 then, the QueryNode base 203 class is used to derive a number of particular QueryNode subclasses, each one supporting a particular query model. The basic QueryNode subclasses include various boolean query models, such as an AndQueryNode 203.1 class, an OrQueryNode 203.2 class, and a NotQueryNode 203.3 class, a full text query model, such as WordQueryNode 203.4 class. Other application specific query models can also be derived as needed from the QueryNode base 203 class, depending on the type of database being searched. For databases that incorporate various fields, such as date, time, author, document category, and the like, specific query models for each field type can be implemented with appropriate QueryNode subclasses, such as CategoryQueryNode 203.4 class or DateQueryNode 203.5 class. A derived QueryNode 203.x subclass may also include additional or data members, such as an array of documents and scores in order to execute a particular query model on the array.

Each newly created QueryNode 203.x subclass will have the attributes of the QueryNode 203 base class. This feature makes the query node architecture extensible. In contrast, in conventional search applications, such as database management systems, word processors, records management, and the like, the number and type of query models that can be used is fixed: the applications programmer can only use the specific query models that the software manufacturer has provided, and cannot create new query models for use in the application.

As noted above, the next function of the QueryNode 203 class provides improved performance by evaluating only non-zero documents. This features provides especially improved performance for boolean AND operations, typically the most common complex search operation, because the function is evaluation only once for the number of non-zero documents resulting from the child search query that returns the fewest non-zero documents. For example, the next function of a multiway AndQueryNode with an arbitrary number of children QueryNodes may be implemented as follows:

```
class MultiAndQueryNode: :next(int* doc_num, float* doc_score)
{
    int i;
    int checknext = *doc_num;
    int searching = 1;
    int childnext;
    *QueryNode childQueryNode_[MAX_CHILDREN];
    float childscore[MAX_CHILDREN];
    while (searching)
    {
        searching = 0;
        for (i=0; i<numChildren_; i++)
        {
            childnext = checknext;
            if (!childQueryNode_[i]->next(&childnext,
                &childscore[i])
                return 0;
            if (childnext > checknext)
            {
                checknext = childnext;
                searching = 1;
                break;
            }
        }
    }
    weightscores(childscore, numChildren_);
    *doc_num = checknext;
    *doc_score = score_function(childscore, numChildren_) ;
    return 1;
};
```

In this example, the MultiAndQueryNode calls the next function of each of its children QueryNode 203 objects in the for loop by iterating over numChildren. Each child QueryNode 203 object gets as input the document number output by another child QueryNode 203 object. This allows for query optimization and for the boolean and logic. If the document number returned by a child QueryNode 203 object in the variable childnext is greater than checknext, which was the document number passed to the child QueryNode 203 object, then the child QueryNode's next function located a document satisfying the query model of the child QueryNode 203 object. In this case, the searching flag is set true, and the for loop advances to the next child QueryNode 203 object. Searching is continued until one of the child QueryNodes is unable to locate a document that satisfies the particular search operation represented by the child QueryNode 203 object. The MultiAndQueryNode object then executes a weighting function on the returned document scores. The weighting function is determined by the applications programmer to implement any desired ranking or evaluation of the document scores. The AndQueryNode 203 object sets as its output the document number returned as result of all the child QueryNodes, and a document score based on a scoring function, and returns 1 indicating that the search query was successful.

Referring again to FIG. 2, there is also shown the class hierarchy for the NodeCreator 201 class. For each QueryNode 203 class, there is a corresponding NodeCreator 201 class. Each NodeCreator 201 class includes a member function that creates a new QueryNode 203 object of the associated QueryNode 203 class, and variably typed array including both string values ("strings" here includes numerical values if appropriate to the query model) and pointers to other QueryNode 203 objects that stores the parameters to be passed to the new QueryNode 203 object that the NodeCreator 201 object instantiates. The NodeCreator 201 object will pass to the created QueryNode 203 object as its data member the data elements to be operated on by the search operator for the query model. The NodeCreator 203 base class can be represented as follows:

```
class NodeCreator {
    public:
        virtual QueryNode* CreateQueryNode (int
    num_args, argument* args);
};
struct argument {
    enum {STRING, NODE} type;
    union {
        char* STRING;
        QueryNode* node;
    };
};
```

Each NodeCreator 201 object instantiates a particular QueryNode 203 object, providing it with the proper arguments. The NodeCreator 201 object then returns a pointer to the QueryNode 203 object. Typically, the CreateQueryNode is a call to the object constructor function of the appropriate QueryNode 203.x class. In addition, the CreateQueryNode may perform additional work, such as handling delayed binding to database files for a particular query model.

In some instances, the CreateQueryNode function may not need to call a QueryNode 203 object constructor at all, for example, where there are multiple instances of a given search query in a more complex query such as: (OR(AND(HASWORDx)(DATE>03/03/94))(AND(HASWORDy)(DATE>03/03/94))

Here a DateQueryNode 203.5 object is used twice for a given search query, and instead of creating multiple instances, the CreateQueryNode may return multiple pointers to the same DateQueryNode 203.5 object.

The QueryNode 203 and NodeCreator 201 classes have been described and illustrated as implemented in an object oriented language. Alternatively, the invention can be implemented in a procedural language, such as C, by defining a QueryNode 203 as a variable size struct, with a pointer member to the next function, and similarly by defining a NodeCreator 201 as a struct with a pointer member to the creator function. The invention may also be implemented in assembly language, or by firmware programming in a suitable PLA, FPGA, or similar device.

Referring again to FIG. 1 then, for each component part of the search query, the parser 109 determines the search operator keyword 115 and from the search operator obtains a pointer 117 to the particular NodeCreator 201 object that creates the appropriate QueryNode 203 object for the search operator. The parser 109 calls the NodeCreator 201 object, and passes to it an array of strings or QueryNodes 203 objects. The called NodeCreator 201 object will then execute its CreateQueryNode function, by instantiating a new instance of the appropriate QueryNode 203 class, providing it with the passed in arguments. The new QueryNode 203 object will be specifically enabled to perform a search only on the data elements that is has been provided with by the NodeCreator 201 object. The NodeCreator 201 object will then return to the parser 109 a pointer to the new QueryNode 203 object.

Figure 3:
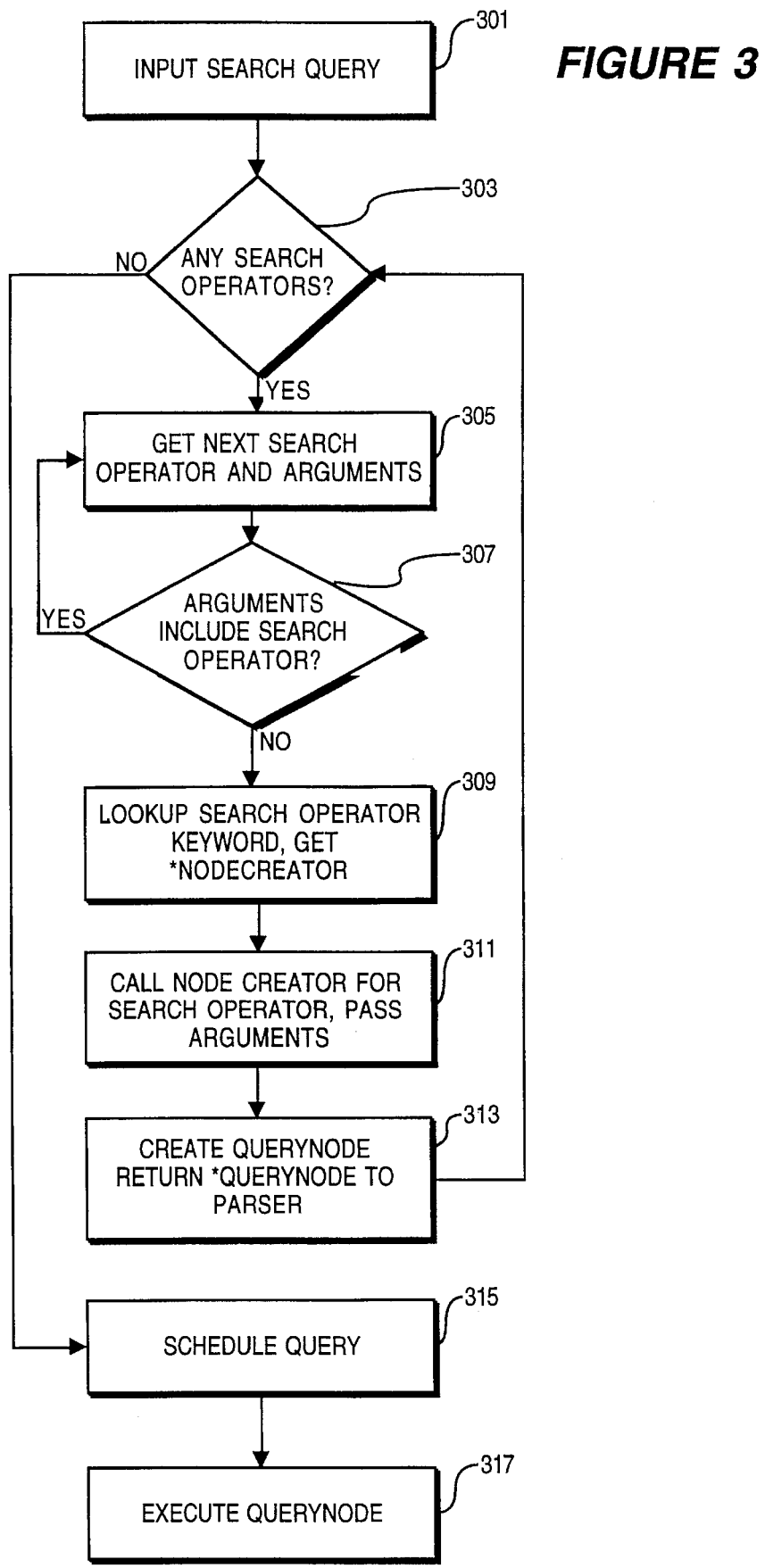
FIG. 3 is a flowchart of the method of operating the information retrieval system of the present invention.

Because each QueryNode 203 object takes both string and other QueryNodes as arguments, the parser 109 handles complex search queries by creating a "top" QueryNode 203 object that represents the top level search operator, the arguments of the top QueryNode 203 object being pointers to child QueryNode 203 objects, and so on. Thus, in the foregoing example, the parser would create a top AndQueryNode 203.1 object. This process is described with respect to FIG. 3.

First, the search query is input 301 into the search query manager 103, and passed to the parser 109. The parser 109 tests 303 whether there are any search operators in the search query, and if so, proceeds to evaluate the query by reading 305 the next search operator and arguments, in this example, the full search query input shown above. The parser 109 tests 307 whether the arguments include any search operators, indicating a nested child search query. If so, the parser 109 recurses and gets 305 the next search operator and arguments. In this example, the arguments are themselves three search operators with arguments. This recursion repeats until the obtained arguments are only string types. In this example, the parser 109 would recurse once, and select the (HASWORD computer) query.

At this point the parser 109 evaluates the first child search query (HASWORD computer). The parser 109 looks up 309 the "HASWORD" search operator keyword 115 in the table 113 and finds the pointer 117 to the WordNodeCreator object 201.4. The parser 109 then calls 311 the WordNodeCreator 201.4 object, passing to it an array of one argument of type string, the string data member pointing to the string "computer." The WordNodeCreator's CreateQueryNode function will execute, and create 313 a new WordQueryNode object that describes, through its next function, all documents in the database 121 that contain the word "computer." This WordQueryNode 203.4 object will be stored in the address space of the search application 125. The WordNodeCreator 201.4 object returns a pointer to WordQueryNode 203.4 object to the parser 109.

The parser 109 then again tests 303 for remaining search operators. The parser 109 then gets 305 the next child search query (NOT(HASWORD Intel)). Since this is itself a complex query, the parser 109 recurses 307 and evaluates the (HASWORD Intel) search query. The parser 109 again looks up 309 the "HASWORD" search operator keyword 115 in the table 113, and calls 311 the WordNodeCreator 201.4 to create 313 a second WordQueryNode object 203.4 for the string "Intel." The parser 109 will return from one level of recursion and lookup 309 the "NOT" search operator keyword 115, and obtain the pointer to the NotNodeCreator 201.3 object. It will call 311 this object, passing to it an array with one argument whose type is NODE and whose data member is a pointer to the WordQueryNode 203.4 object for "Intel." The NotNodeCreator 201.3 object will create 313 the corresponding NotQueryNode 203.3 object, returning a pointer to it. The parser 109 will evaluate the (DATE>03/03/1994) conjunct, in a similar manner, creating 313 a DateQueryNode 203.6 object with the arguments of ">" and "03/03/1994."

Figure 4:
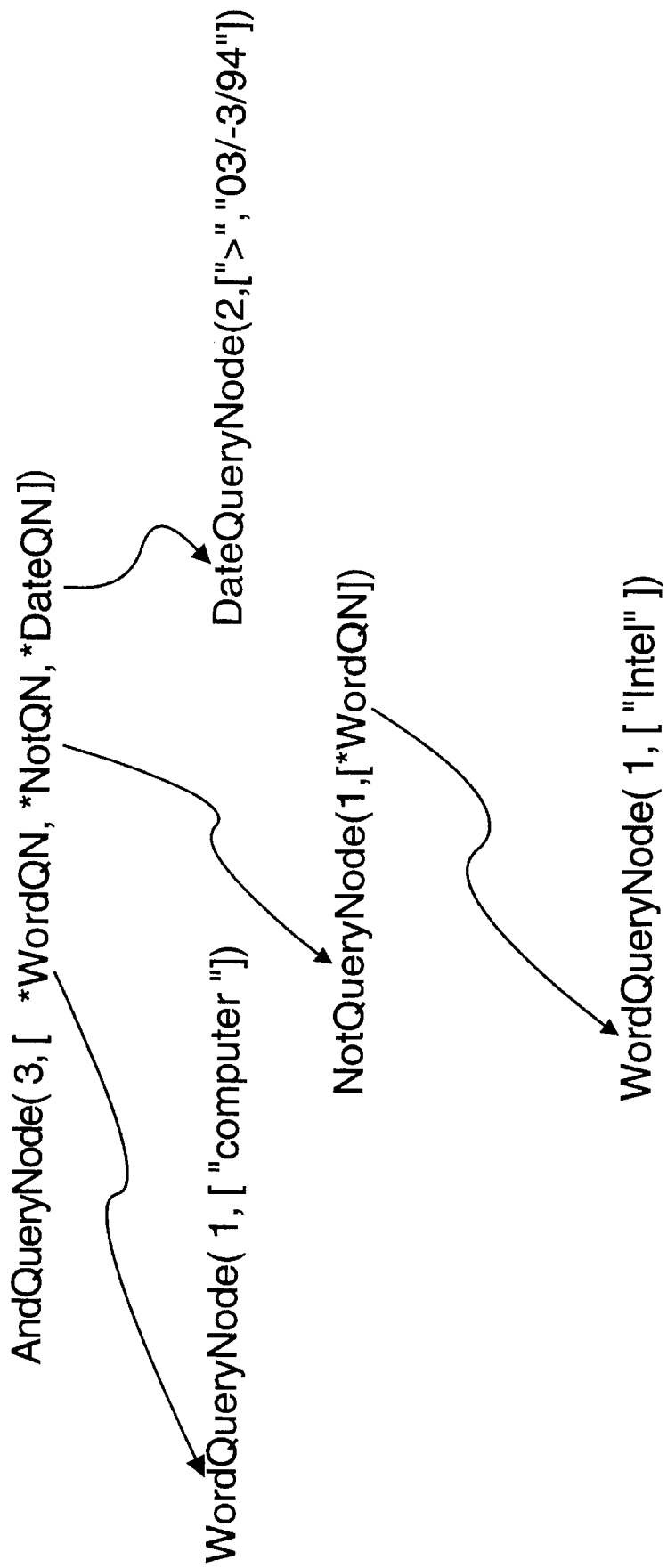
FIG. 4 is a illustration of a hierarchical top node resulting from parsing an input search query.

Once all the child search queries are created, the parser 109 will return to the first level of recursion, to complete the evaluation of the "AND" search operator. From the from the table 113 the parser 109 will call 311 the AndNodeCreator 201.1 object, passing to it an array of three arguments of type NODE, the array members being the pointers to the QueryNode objects for (HASWORD computer), NOT(HASWORD Intel) and DATE(>03/03/1994) that have just been instantiated. The AndNodeCreator 201.1 object will create 313 a new AndQueryNode 203.1 object with its data members being the pointers to the child QueryNodes 203 objects. FIG. 4 illustrates the hierarchical structure of the resulting AndQueryNode 203.1 object.

Once the search query has been completely evaluated by the parser 109, the search application 125 then schedules and manages 315 the execution of the search query as necessary. In the preferred embodiment, execution of the various QueryNodes is delayed until the search application 125 requests the results of the search query.

In an alternative embodiment the present invention may be implemented without the use of the parser 109 if the structure of the search query is fixed. For example, if there is always a date, a title, and an author field for every query (or some other fixed format query), then a top AndQueryNode 203.1 or OrQueryNode 203.2 object can be created each time with the appropriate child nodes.

When the search query is to be executed 317, the processor 101 begins execution with the top node, here the AndQueryNode 203.1 object. Since the AndQueryNode arguments are themselves pointers to further child QueryNode 203 objects, the processor 101 will effectively unravel the hierarchical top node, executing 317 the next function of the appropriate child node. The execution order of the various child QueryNodes is not necessarily serial, but can be defined by the applications programmer to optimize search performance.

A simple example illustrates the iterative execution of the QueryNode 203 objects. Assume a search query of the form AND(HASWORDx)(HASWORDy)

and a database 121 including the following documents:

TABLE 1

| Document No. | Contents |
|---|---|
| 1 | a |
| 2 | x |
| 3 | c |
| 4 | xy |

When parsed, there will be an AndQueryNode 203.1 top node object with two child WordQueryNode 203.4 objects. These QueryNodes are not executed until the search application 125 calls the next function of the top node to return the first "hit" or non-zero document. Table 2 shows one possible invocation order for evaluating the search query:

TABLE 2

| Invocation | QueryNode | Doc. No. (In) | Doc. No. (Out) | Doc. Score Out |
|---|---|---|---|---|
| a | WQN (x) | 0 | 2 | 1 |
| b | WQN (y) | 2 | 4 | 1 |
| c | WQN (x) | 4 | 4 | 1 |

Since there has not been any previous search, the search application 125 requests a non-zero document with a document number equal to or greater than 0. The AndQueryNode 203.1 object then calls (a) its first child WordQueryNode 203.4 object to return a non-zero document, that is a document containing "x," taking 0 as the input document number. As Table 1 shows, document number 1 does not contain "x," but document number 2 does, so the WordQueryNode 203.4 object's next function returns document number 2 as the first non-zero document. The AndQueryNode 203.1 object then calls (b) the WordQueryNode 203.4 object for "y", requesting a non-zero document with a document number greater than or equal to 2. Table 1 shows that document number 2 does not contain "y," nor does document 3. The next function will iterate, finding "y" in document 4, and return document number 4. Since the input document number is not equal to the output document number, there has not been a match to the search query. The AndQueryNode 203.1 object the calls (c) the WordQueryNode 203.4 object for "x" again, with an input document number 4, to locate a non-zero document. Here document number 4 contains "x" and this document number is returned by the WordQueryNode 203.4 object to the parent AndQueryNode 203.1 object. The AndQueryNode 203.1 object then returns document number 4 with its document score to the search application 125.

This simple example demonstrates several points. First, the execution of individual QueryNode 203 objects is iterative, each QueryNode 203 object essentially capable of returning a single document number, instead of evaluating and scoring all the documents in the database 121. This allows the search application 125 to effectively manage the execution of the search query. Second, most QueryNode 203 objects will execute on a limited search space, instead of the entire database 121. In the foregoing example, the WordQueryNode 203.4 object for "y" began its execution on document number 2, document number 1 having already been eliminated from consideration. This allows for efficient searching of the database.

In an alternate embodiment, a QueryNode 203 object can execute after instantiation, for example, as part of their constructor function, and compute the scores for documents before the top node's next function is first called. Then the QueryNode 203 object can simply lookup the document scores as when its next function is called. The architecture of the QueryNodes allows this flexibility in design, affording the applications programmer the ability to optimize the performance of each QueryNode 203 subclass.

Returning to the first example then, the processor 101 will execute first child of the AndQueryNode 203.1 object, the WordQueryNode 203.4 object for "computer." The next function of this QueryNode is called and either returns 1, and the document number of a document containing the word "computer," or 0 indicating no remaining hits. After the first WordQueryNode 203.4 object returns a non-zero document, the processor 101 then executes 317 the NotQueryNode 203.3 object, and its child node, the WordQueryNode 203.4 object for "Intel," using the returned document number as the starting point for the next function. The result of the WordQueryNode 203.4 object on "Intel" is then passed the NotQueryNode 203.3 object, which performs its next function, returning a document number and score for a document that does not contain the word "Intel." Next, the processor 101 executes the DateQueryNode 203.6 object with its arguments, returning a document number and score as appropriate. Finally, as all the arguments of the AndQueryNode 203.1 object have been evaluated, the processor 101 can then complete the execution 317 of the AndQueryNode 203.1 object's next function, performing a boolean and operation on the documents identified by the document numbers returned by the children nodes. If the result is a match of the document numbers, it is returned to the search application 125 for outputting on the display. Depending on user inputs in response, the search application 125 may locate another document, or terminate the search.

Figure 5:
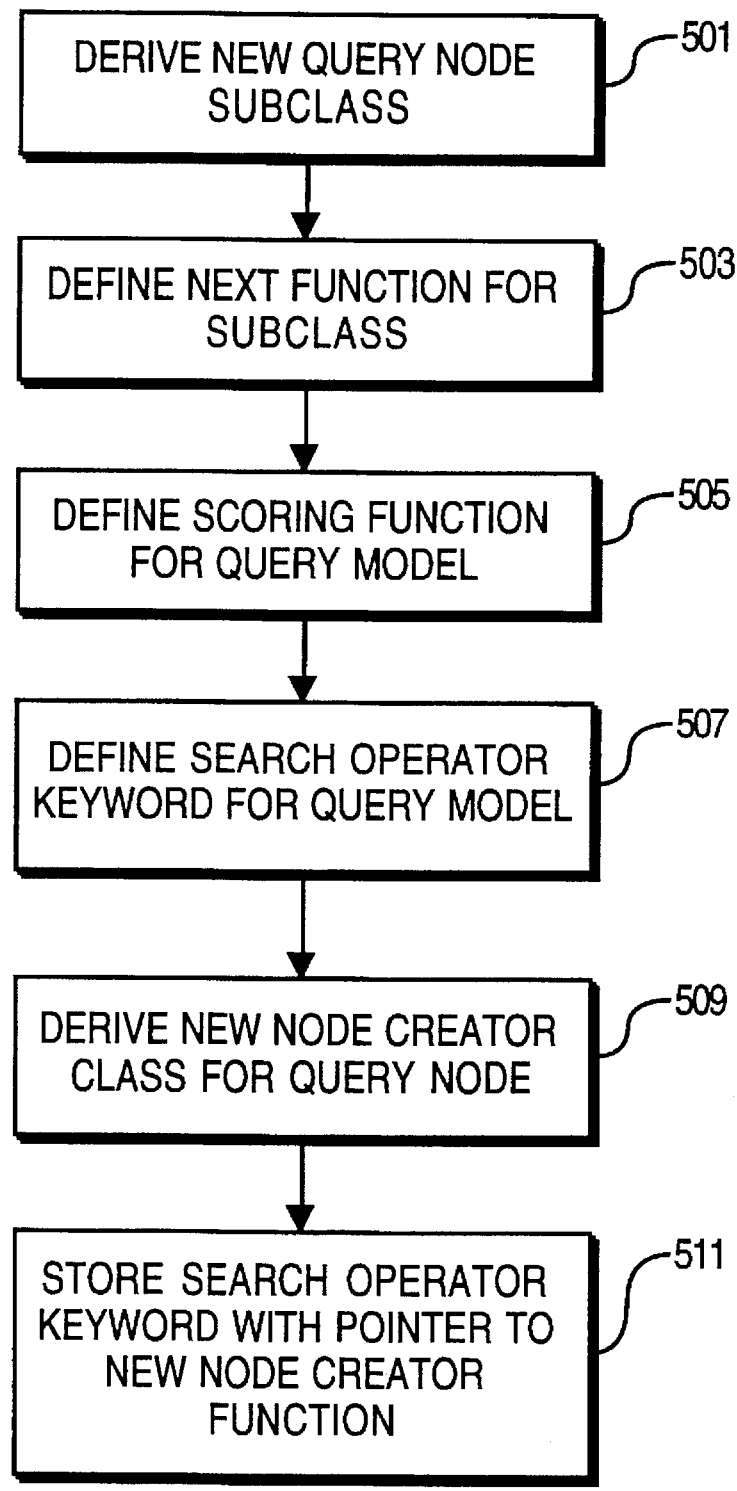
FIG. 5 is a flowchart of the method creating a new QueryNode class for use with the information retrieval system.

Referring now to FIG. 5, there is shown the flowchart for creating new QueryNodes 203 subclasses to integrate new query models into the information retrieval system 100. First, the applications programmer derives 501 a new QueryNode 203.x subclass from the QueryNode 203 base class in a conventional manner, inheriting the base class data members, specifically the next function, and defining the appropriate number and type of arguments. The applications programmer may then further specify 503 the next function for the new subclass if desired to optimize its performance. A particular scoring function can then be defined 503 appropriate to the query model. To provide a user interface for the query model, a search operator keyword is defined 507. The applications programmer then derives 509 a new NodeCreator 201.x subclass for the new QueryNode 203.x subclass. This NodeCreator 201.x subclass will create a new instance of the QueryNode 203.x subclass as described. Finally, the applications programmer updates the table 113 by storing 511 the search operator keyword with a pointer to the new NodeCreator 201.x object. When the search application 125 is compiled, the table 113 will have the correct addresses for the various NodeCreator 201 objects. The parser 109 will then be able to instantiate a QueryNode 203.x object for the new query model when the appropriate search operator is used in a search query.

I claim:

1. A system for executing search queries on a database comprising a plurality of documents, each search query having a search query operator and at least one search data element, the system comprising:

a search query manager that receives a search query including at least one search query operator and at least one search data element associated therewith to be operated on by the search query operator;

a storage structure that stores associations between search query operators and query node creators, each query node creator for creating a query node that executes a search query for a search query operator upon at least one search data element associated therewith, to identify a next document therein as a function of the search query operator and the at least one search data element of the search query, and returning an identifier of the document, and a score for the document;

a parser, coupled to the storage structure and further coupled to the search query manager for receiving therefrom the search query, the parser identifying each search query operator and search data element in the search query, and for each search query operator in the search query, identifying the query node creator associated with the search query operator and calling the associated query node creator to create a query node for the search query operator and the search data element associated therewith; and a processor, coupled to the parser, and receiving therefrom a first query node, and executing the first query node.

2. The system of claim 1, wherein each query node further comprises:

an argument list containing a first document number;

a code object that searches the database to retrieve a document having a second document number greater than the first document number and a non-zero document score, the code object setting the first document number to the second document number and a document score to the non-zero document score.

3. The system of claim 1, wherein the first query node is comprised of a plurality of nested query nodes, the processor executing the first query node by executing each nested query node.

4. The computer system of claim 1, further comprising:
a) a query node base class, including:
i) a search data element member for storing at least one search data element; and,
ii) a search function member accepting an input including a first document number, the search function member for searching the database to retrieve a document having a second document number greater than the first document number, and a non-zero document score, and to return the non-zero document score and the second document number;
b) at least one query node class derived from the query node base class;
c) a query node creator base class including:
a query data element member that stores at least one query data element including either a search data element or a subordinate query node; the query node creator base class returning a query node having as a search data element the query data element in response to an invocation of a constructor function of the query node creator base class by the parser; and
d) at least one query node creator class derived from the query node creator base class.

5. A computer implemented method of creating search queries for a database comprising a plurality of documents, the method comprising:

storing in a computer readable medium a plurality of query node creators, each query node creator capable of creating a query node that executes a search query to identify a next document in the database as a function of a search query operator upon at least one data element;

storing in the computer readable medium a plurality of search operators, each search operator associated with a selected query node creator;

receiving an input search query having a search query operator and at least one data element associated therewith;

identifying each search query operator and associated data element in the search query; and for each search query operator in the search query:
identifying the query node creator associated with the search query operator in the computer readable medium; and
invoking the associated query node creator to create query node for the search query operator and the associated data element.

6. The method of claim 5, further comprising the step of:
creating a hierarchical ordering of the created query nodes.

7. The method of claim 5, further comprising the steps of:
selecting at least one of the created query nodes; and
executing the selected query nodes on the database to identify at least one document therein corresponding to the data elements of the search query, and returning an identifier of the document, and a score for the document.

8. The method of claim 7, wherein the step of selecting at least one of the created query nodes further comprises optimizing an ordering of the created query nodes, and the step of executing the selected query nodes further comprising executing the optimized ordering of selected query nodes.

9. A computer implemented method of executing a search query including a search query operator associated with at least one search data element, on a database comprising a plurality of documents, each document having a document number, the method comprising:

receiving an input including a first document number, and a first document score;

identifying a document having a second document number greater than the first document number and a non-zero second document score as a function of the search query operator and the at least one search data element;

setting the first document number to the second document number; and setting the first document score to the second document score.

10. The method of claim 9, wherein the step of identifying further comprises the steps of:

identifying a document having a second document number greater than the first document number;

determining if the document has a non-zero document score.

11. The method of claim 10, wherein the step of determining if the document has non-zero document score further comprises the steps of:

scoring the document on a function defined by a search query operator and a data element.

12. An information retrieval system for searching and retrieving selected documents in a database of documents in response to a search query including at least one search query operator and at least one associated data element, each document having an identifier and a document score, the information retrieval system, comprising:

a) a query node base class including:
 i) a search data element member for storing at least one search data element; and,
 ii) a search function member accepting an input including a first document number, the search member function executable by a processor for searching the database to retrieve a document having a second document number greater than the first document number, and a non-zero document score, and to return the non-zero document score and the second document number.

b) at least one query node class derived from the query node base class;

c) a query node creator baseclass including:
 a query data element member that stores at least one query data element including either a search data element or a subordinate query node; the query node creator base class returning a query node having as a search data element the query data element in response to an invocation of a constructor function of the query node creator base class; and d) at least one query node creator class derived from the query node creator baseclass, each query node creator class associated with a selected search query operator.

13. The information retrieval system of claim 12, further comprising:

e) a storage structure that stores each derived query node creator in association with a selected search operator.

14. The information retrieval system of claim 13, further comprising:

f) a parser that identifies in a search query each search operator and associated data elements therewith, and coupled to the storage structure for determining a query node creator associated with each search operator, the parser invoking the query node creator associated with each search operator to creator a query node, and passing to the query node creator the data elements associated with the search query operator.

* * * * *